May 4, 1965 R. L. KEINATH 3,181,517
INLET MANIFOLD
Filed Feb. 3, 1964 2 Sheets-Sheet 1
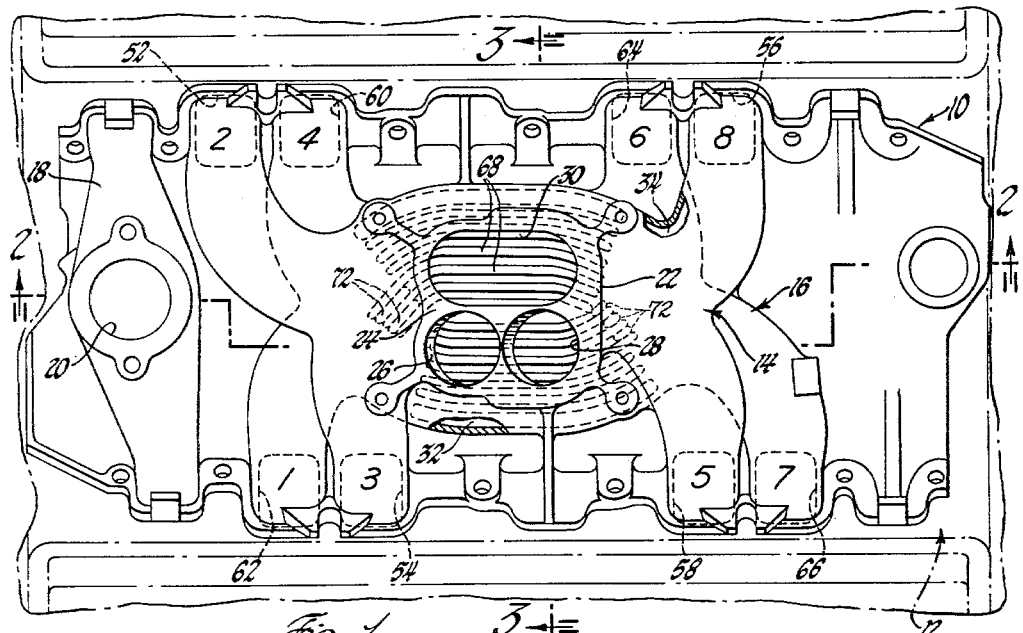
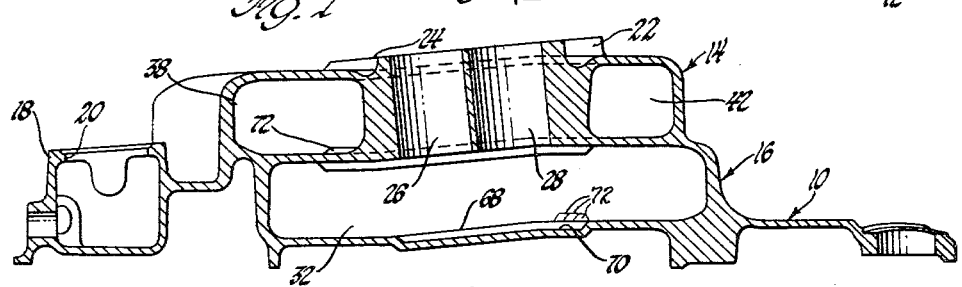
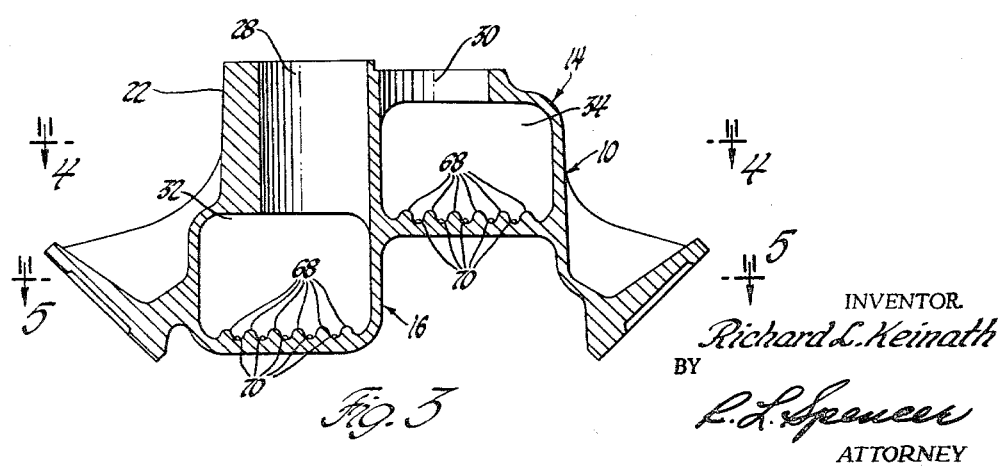
INVENTOR.
Richard L. Keinath
BY
L. L. Spencer
ATTORNEY May 4, 1965  R. L. KEINATH  3,181,517
INLET MANIFOLD Filed Feb. 3, 1964  2 Sheets-Sheet 2

INVENTOR.
Richard L. Keinath
BY
R. L. Spencer
ATTORNEY

United States Patent Office 3,181,517
Patented May 4, 1965

3,181,517
INLET MANIFOLD
Richard L. Keinath, Rochester, Mich., assignor to General Motors Corporation, Detroit, Mich., a corporation of Delaware
Filed Feb. 3, 1964, Ser. No. 342,038
4 Claims. (Cl. 123—52)

The present invention relates to internal combustion engines and more particularly to the inlet manifold system for supplying a fuel and air mixture to the inlet ports of the engine cylinders.

Inlet manifolds for use on internal combustion engines are often designed with passages from the carburetor to the respective cylinders of unequal length. Such passage design results in supplying to the various cylinders a fuel and air mixture of varying proportions.

Another problem common in the conventional inlet manifold is the accumulation of fuel in the distribution passage by the condensation of fuel from the fuel and air mixture.

An object of this invention is to provide an inlet manifold having ribs within the distribution passages for collecting and channeling condensed fuel to the respective branch passages for evaporation into the fuel mixture.

A further object of this invention is to provide an inlet manifold having means therein particularly arranged to minimize condensation in a fuel distribution passage and particularly adapted to facilitate the injection of condensed fuel into the path of flow of vaporized fuel.

Another object of this invention is to provide an engine inlet manifold having a bottom wall including a series of ribs wherein the upper tips of the ribs are coextensive with the surface of the bottom wall throughout substantially the entire length of the ribs and provided with raised rib tip portions at one end of the ribs and extending above the surface of the bottom wall into the path of flow of vaporized fuel.

A specific object of this invention is to provide ribs as described forming channels for collecting condensed fuel and wherein the channels are disposed below the surface of the bottom wall of the fuel distribution passages and wherein the end portion of the ribs extends upwardly above the surface of the bottom wall of the fuel distribution passage into the path of flow of vaporized fuel.

These and other objects will become more apparent as reference is had to the accompanying drawings and specification wherein:

FIGURE 1 is a plan view of the inlet manifold embodying the present invention and mounted upon a conventional V-8 engine.

FIGURE 2 is a sectional view of the inlet manifold taken substantially along the line 2—2 of FIGURE 1, in the direction of the arrows, and showing the lower distribution passage, carburetor riser passages and upper branch passages of the inlet manifold.

FIGURE 3 is a sectional view taken substantially along the line 3—3 of FIGURE 1, in the direction of the arrows, showing the ribbed floor of the distribution passages and the riser passages joining the distribution passages.

Figure 4:
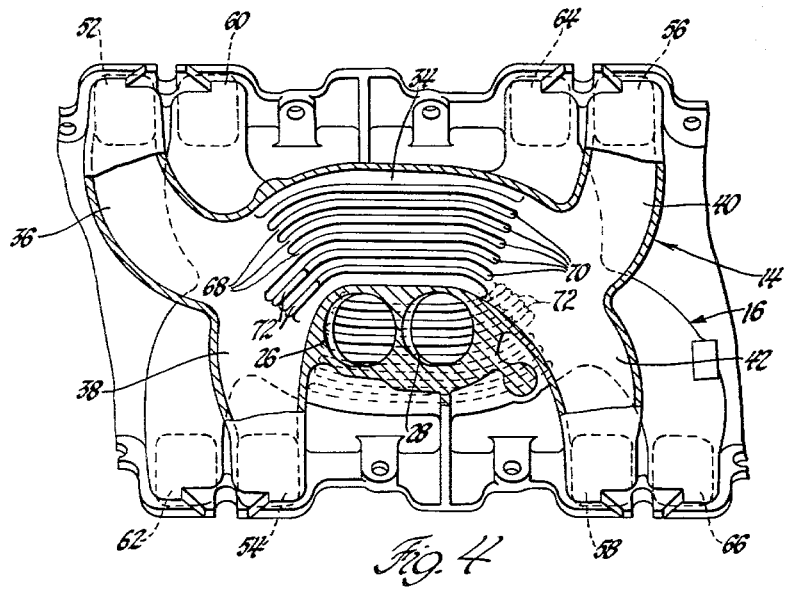

FIGURE 4 is a view taken substantially along the line 4—4 of FIGURE 3, in the direction of the arrows, with sections cut away, to show the upper portion of the inlet manifold connected with the cylinders 2, 3, 5 and 8.

Figure 5:
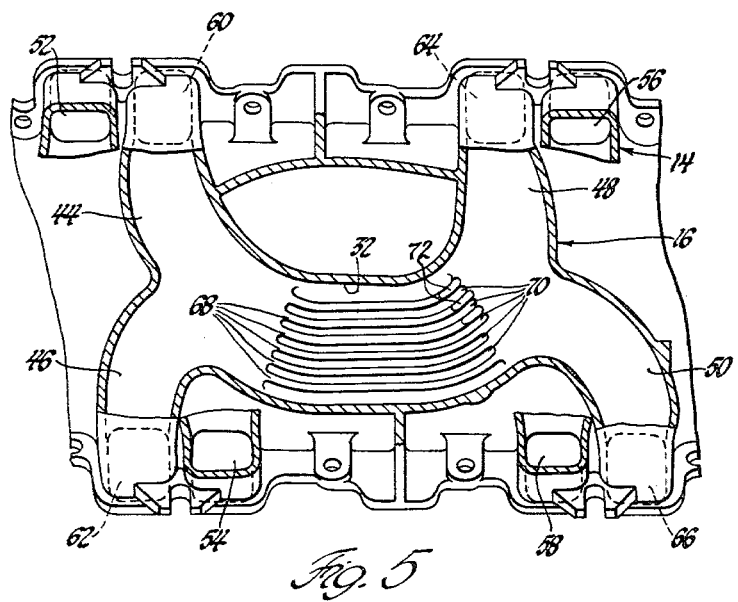

FIGURE 5 is a view substantially along the line 5—5, in the direction of the arrows, as shown in FIGURE 3, illustrating the lower section of the inlet manfold connected with the cylinders 1, 4, 6 and 7.

Referring to the drawings, as best seen in FIGURE 1, the inlet manifold 10 of this invention is mounted on a conventional V-type internal combustion engine 12 having eight cylinders 1, 2, 3, 4, 5, 6 7 and 8. The inlet manifold of the double H-type having an upper H portion 14 and a lower H portion 16 is integrally cast to form the one unit manifold 10.

The engine 12 includes a cylinder block forming a pair of angularly disposed banks of aligned cylinders. In the present instance each bank of cylinders includes a pair of center cylinders and a pair of end cylinders. A cylinder head is secured to each bank to close the upper ends of the cylinders and form combustion chambers, each of which is charged by a separate intake passage that extends transversely through the head. The outer ends of the intake passage form rows of aligned intake ports on the cylinder heads. The present inlet manifold 10 is a single integral casting formed with ports adapted to be secured to the cylinder heads in alignment with the intake passages of each respective cylinder. The manifold 10 may be secured to the cylinder heads by bolts or any other suitable means. The forward end of the manifold 10 may include a transverse cooling head 18 that collects the liquid in the cooling system and discharges through an outlet 20 for return to the radiator.

The center of the manifold 10 has a carburetor riser 22 on the top of which there is included a mounting flange 24 adapted to receive a carburetor (not shown). The riser 22 includes a pair of substantially vertical riser passages 26, 28 for connecting the carburetor with the lower portion 16 of the manifold. An oval riser passage 30 is formed in the riser 22, adjacent passages 26 and 28, for connecting the carburetor to the upper portion 14 of the manifold.

A pair of substantially horizontal distribution passages 32 and 34 extend longitudinally of the manifold 10 substantially parallel to each other and pass directly under the riser 22. As can best be seen in FIGURES 2 and 3, the riser passages 26 and 28 intersect the top of distribution passage 32 and the riser passage 30 intersects the top of the distribution passage 34. The riser passages intersect the distribution passages substantially in the center thereof. Thus, it can be seen that the charges of fuel and air from the charge forming passages in the carburetor mounted on the flange 24 will flow directly into the distribution passages 32 and 34 and toward the opposite ends thereof.

As can best be seen in FIGURE 4, the upper H portion 14 has branch passages 36 and 38 extending from one end of distribution passage 34 and branch passages 40 and 42 extending from the other end. As seen in FIGURE 5, the lower H portion 16 has branch passages 44 and 46 extending from one end of distribution passage 32 and branch passages 48 and 50 extending from the other end. Each of these branch passages extends substantially transversely of the manifold from the distribution passage with the ends most remote from the distribution passage forming separate ports 52, 54, 56 and 58 for the upper portion 14 and ports 60, 62, 64 and 66 for the lower portion 16, respectively. Each of the ports is positioned to register with an intake port of one of the cylinders. Thus, it can be seen that each distribution passage is connected to four branch passages of substantially equal length so that a charge of air and fuel in each distribution passage may flow therefrom through a branch passage to one of the four associated cylinders.

During normal operation, a combustible charge of air and fuel will be formed in the carburetor (not shown) and will flow downwardly through the riser passages 26, 28 and 30 and into the centers of the distribution passages 32 and 34. The charge will then flow toward the end of the distribution passages and into the branch passages for distribution into the cylinders. Since the passages to the various cylinders are substantially identical, they will all receive substantially identical charges.

During certain periods of operation of the engine, particles of fuel tend to settle out of the air and fuel charge and prevent proper operation of the engine. As best seen in FIGURES 4 and 5, a series of ribs 68 level with the lower surface or wall of the passage and depressions 70 below the surface are formed in the lower surface of the distribution passages 32 and 34 for collecting such droplets. The ends 72 of a portion of the ribs 68 are formed above the surface and extend into the branch passages, as best seen in FIGURES 2, 4 and 5. The raised ribs are extensions of the ribs directly below the riser inlet passages where a larger amount of fuel would settle out of the charge.

The direction of flow of the fuel charge in passages 32 and 34 continuously changes in response to fuel demands made upon the fuel charge in the intake manifold by the individual engine cylinders during operation of the engine. With an engine firing order of 1-8-4-3-6-5-7-2, it will be understood that the direction of flow is continuously changing in these passages, assuming fuel condensation exists in the channels formed by the ribs 68, the raised ends 72 of the ribs 68 which extend from the distribution passages 32 and 34 in the branch passages 48, 50 and 36, 38, respectively, bleed off previously condensed fuel into the path of flow of the vaporized fuel, thereby enriching the fuel mixture.

The arrangement of the ribs whereby the upper surface of the ribs 68 throughout substantially the entire length of the ribs is flush with or coextensive with the bottom wall of the distribution passages 32 and 34, and with the rib portions 72 only being raised above the bottom wall of the distribution passage minimizes turbulence which would otherwise occur in the zone of the ribs, minimizes fuel condensation as would occur during initial engine warm up. At the same time, the raised tip portions which extend upwardly above the bottom wall of the passages 32 and 34 provide an elevated rib portion whereby the condensed fluid is raised upwardly into the path of flow of the fuel charge to facilitate the injection of condensed fuel into the flow path of the vaporized fuel.

While the preferred embodiment of this invention has been shown and described herein, it is obvious that many structural changes may be made without departing from the spirit and scope of the following claims.

I claim:

1. An inlet manifold adapted to be installed on an engine having a plurality of cylinders, said inlet manifold including a plurality of distribution passages extending longitudinally of said manifold, each end of said distribution passages having a pair of branch passages integrally connected at one end to each other and to the end of the associated distribution passages, said branch passages extending substantially transversely of said manifold, the other end of each branch passage being connected to an intake port of one of said cylinders, a plurality of riser passages extending substantially vertically from the center of said distribution passages, each of said riser passages having one of their ends connected to one of said distribution passages for delivering a fluid charge of fuel and air to said distribution passage from a carburetor operatively connected to the other end of said riser passage, each of said distribution passages having a series of ribs and depressions along substantially their entire lower surface for collecting such fuel as may drop from the fluid charge, and a plurality of said ribs extending from said distribution passage into one or more of said branch passages associated with the respective distribution passage.

2. An inlet manifold adapted to be installed on an engine having a plurality of cylinders, said inlet manifold including a plurality of distribution passages extending longitudinally of said manifold, each end of said distribution passages having a pair of branch passages integrally connected at one end to each other and to the end of the associated distribution passages, said branch passages extending substantially transversely of said manifold, the other end of each branch passage being connected to an intake port of one of said cylinders, means for introducing a fluid charge of fuel and air to said distribution passages, each of said distribution passages having a series of ribs and depressions along substantially their entire lower surface for collecting such fuel as may drop from the fluid charge, and a plurality of said ribs extending from said distribution passage into one or more of said branch passages associated with the respective distribution passage.

3. A fuel inlet manifold for an engine, said manifold including a fuel distribution passage having a bottom wall, a series of spaced ribs in said bottom wall forming channels for collecting condensed fuel therein, the upper tips of said ribs being flush with the surfaces of said bottom wall and said channels being disposed below the surface of said bottom wall throughout substantially the entire length of said ribs, and raised rib portions extending upwardly into the path of flow of vaporized fuel at one end of a portion of said ribs.

4. An inlet manifold for receiving a fluid combustible charge of fuel dispersed in air and distributing said charge to a plurality of cylinders of an internal combustion engine, said manifold including a distribution passage for receiving the combustible charge, branch passages extending between said distribution passage and said cylinders for channeling a portion of the combustible charge to each of said cylinders, means in the lower surface of said distribution passage for collecting fuel that settles from the combustible charge and returning such fuel to the charge, said last named means for collecting fuel including a series of spaced depressions below the lower surface of said distribution passages, a plurality of ribs separating said depressions having their tops level with the lower surface of said distribution passages, and raised rib portions extending above the level of the lower surface of said passages at one end of a portion of said ribs and extending from said distribution passages into said branch passages.

References Cited by the Examiner

UNITED STATES PATENTS

| | | | |
|---|---|---|---|
| 2,936,746 | 5/60 | Rundquist | 123—52 |
| 2,938,507 | 5/60 | Burnell | 123—52 |
| 3,014,470 | 12/61 | Burrell | 123—52 |

FRED E. ENGELTHALER, *Primary Examiner.*